United States Patent [19]

Clough

[11] Patent Number: 6,019,920
[45] Date of Patent: Feb. 1, 2000

[54] GRANULAR-TYPE MODIFIED POLYTETRAFLUOROETHYLENE DISPERSIONS AND FUSED ARTICLES PREPARED THEREFROM

[76] Inventor: Norman Ernest Clough, 6 Lodge Park, Biggar, Lanarkshire ML12 6ER, United Kingdom

[21] Appl. No.: 09/155,254

[22] PCT Filed: Apr. 1, 1997

[86] PCT No.: PCT/GB97/00920

§ 371 Date: Jan. 19, 1999

§ 102(e) Date: Jan. 19, 1999

[87] PCT Pub. No.: WO97/36953

PCT Pub. Date: Oct. 9, 1997

[30] Foreign Application Priority Data

Apr. 30, 1996 [GB] United Kingdom .................. 9606824

[51] Int. Cl.[7] ...................................................... B27J 5/00
[52] U.S. Cl. ........................................... 264/127; 521/145
[58] Field of Search .............................. 264/127; 521/145

[56] References Cited

U.S. PATENT DOCUMENTS 3,855,191  12/1974  Doughty, Jr. et al. ................. 260/87.5
4,186,121   1/1980  Gangal ............................... 260/29.6 F

FOREIGN PATENT DOCUMENTS 0 369 466   5/1990  European Pat. Off. .
0 450 894  10/1991  United Kingdom .

*Primary Examiner*—Morton Foelak
*Attorney, Agent, or Firm*—Gary A. Samuels

[57] ABSTRACT

An aqueous dispersion of modified granular PTFE particles is sprayed or cast to form a sheet. The sheet is then dried and the modified granular particles fused together to form an open network of fused interconnected particles that define a tortuous network of voids through the sheet. It has been found that when the modified granular-type PTPE aqueous dispersions are employed, the resulting fused sheets are stronger than when the usual unmodified PTFE homopolymer of the granular-type is used.

9 Claims, No Drawings

GRANULAR-TYPE MODIFIED POLYTETRAFLUOROETHYLENE DISPERSIONS AND FUSED ARTICLES PREPARED THEREFROM

FIELD OF THE INVENTION

This invention relates to porous polytetrafluoroethylene (PTFE hereinafter) materials formed by fusion of granular-type PTFE resin particles thus creating a loose or open interconnection of fused particles.

BACKGROUND OF THE INVENTION

Porous PTFE articles have been produced by fusing PTFE resin particles together through application of heat at a temperature above the melt (or sinter) temperature of the PTFE.

For example, GB 2 242 431 B to Allan, et al. (W. L. Gore & Associates, Ltd.), describes a sintered porous PTFE structure used as a filter to filter solids or gases from liquids. The porous structures are formed by fusing together particles of granular-type PTFE to form an integral network of void spaces between the particles. The pores are created by the void space between the particles and results in tortuous paths of voids through the article. Because of the small pore size and the chemical inertness of the PTFE, these structures are useful as filters, fuel cell electrodes, photocopy webs or rolls, and the like. However, these structures tend to have weak inter-particle connections and are not as strong as needed for some applications.

U.S. Pat. No. 5,154,866 to Honda (Daikin), describes preparation of porous PTFE articles of sintered granular PTFE and fine powder PTFE used as filters for filtering out small particulate. The preparation comprises the steps of first gelling a PTFE powder prepared by suspension polymerization (which to one skilled in the art identifies the PTFE as granular-type PTPE) at a temperature not lower than the melting point of PTFE. Next the PTFE is pulverized and mixed with an aqueous dispersion of PTFE fine powder prepared by emulsion polymerization. The solids are then coagulated, ram extruded, and baked by heating above the melting point of the PTFE. The gelled PTFE particles are hard and resist compaction. This results in relatively large size pores and the articles are useful mostly for separating out relatively large size particulate.

U.S. Pat. No. 3,855,191 to Doughty, et al.(DuPont Co.) describes a modified granular-type PTFE in which the modification is in use of a modifier monomer which enters into the polymer chain to modify the homopolymer structure without changing the well known nonmelt processible characteristics of the polymer.

SUMMARY OF THE INVENTION

In this invention, strong porous PTFE articles are obtained that are useful as filters in filtration or in the metered dispensing of liquids, as for example in photocopying and in photocopier rolls or webs and in fuel cell electrodes.

The porous PTFE articles are prepared from an aqueous dispersion of particles of at least one non-melt-processible copolymer of granular-type PTFE modified by small amounts of comonomer, by laying down a coating of the dispersion followed by heating to drive off the aqueous liquid and to fuse together the particles into an open network of fused particles that define a tortuous network of interconnected voids through the article between the fused interconnected particles. Thus, the porosity is not due to stretching or expanding of PTFE as is the case in some unrelated PTFEs. On the contrary the granular particles are non-expanded.

As will be discussed below, the granular-type PTFE modified by a small amount of recurring units of a comonomer used herein is commonly referred to in the art as "modified granular PTFE" and this term will be used hereinbelow.

Thus, the product aspect of the invention is two-fold. In one aspect, the product is a porous sheet of particles of modified granular-type PTFE fused together in a manner which forms a strong network of fused interconnected particles, without the need for additives, e.g., fine powder PTFE, to strengthen the article. In the other aspect the product is the aqueous dispersion from which the fused porous sheet is prepared.

It has unexpectedly been found that when the so-called modified granular-type PTFE aqueous dispersions are employed, the resulting fused sheets are stronger than when the usual unmodified PTFE homopolymer of the granular-type is used.

Other aspects and variants of the invention will become evident in the ensuing discussion.

DETAILED DESCRIPTION OF THE INVENTION

By the term, "granular-type PTFE", is meant that type of PTFE resin that is produced by the suspension polymerisation technique. This technique produces a molding resin that can be ram extruded. The term "granular" is a term of art in the PTFE field and refers to the method by which the polymer is made. It has no relationship to particle size.

By the term "modified granular-type PTFE" is meant that non-melt-processible polymer is not granular PTFE homopolymer but is a copolymer in which the homopolymer has been modified by copolymerisation with a copolymerisable ethylenically unsaturated comonomer in a small amount of less than 2%, preferably less than 1%, by weight of copolymer. These copolymers have been called "modified" PTFE by those skilled in the art, because presence of comonomer units does not change the basic nonmelt processable character of homopolymer PTFE. Thus, the term "modified" is used to connote that the good toughness, heat resistance and high temperature stability of the homopolymer is not altered when the homopolymer chain is interrupted by smaller trace units of the comonomer. The recurring comonomer units are ordinarily used to improve creep resistance. Examples of comonomers include olefins such as ethylene and propylene; halogenated olefins such as hexafluoropropylene (HFP), vinylidene fluoride and chlorofluoroethylene; or perfluoroalkyl vinyl ethers such as perfluoropropyl vinyl ether (PPVE). Preferably the comonomer is fluorinated and most preferably is HFP or PPVE.

It is critical that modified granular-type PTFE is used herein. One inventive feature is the greater strength in the resulting fused products over those products that use unmodified polymer. The greater strength is believed due to the greater tendency of the comonomer units of the polymers to melt and bind the other non-meltable components. The modified granular-type PTFE resin particles are available from several sources, such as the DuPont Co., Hoechst, and Daikin.

The aqueous dispersion described above can be used to form a coating or a web which can then be baked to obtain the novel fused composition. The particles of modified granular-type PTFE when fused, or sintered, together at certain contact points provide an integral network of interconnected particles which define a tortuous network of interconnected voids through the compositions.

As is well known, PTFE is produced by at least two distinct procedures which result in two distinct products which have acquired recognition in the art as being two distinct classes of chemicals. In one process, little or no dispersing agent is employed and vigorous agitation is used to produce a coagulated resin that has acquired the designation "granular PTFE resin" in the art. In the second procedure, a fluorinated surfactant is employed and agitation is very mild, producing small spherical particles dispersed in the aqueous medium. In the latter process, coagulation of the dispersion is avoided until after polymerization is completed. This type has acquired the designation "fine powder" dispersion in the art. Subsequent precipitation of the particles produces fine powder resins which are converted to finished products by paste extrusion.

The granular resins consist of stringy, irregularly shaped particles, which can exceed a millimeter in size. The "as-polymerized" granular polymer cannot be used as such, but must be cut to uniform particle size to provide sinterability.

Shaped products are made only by ram extrusion of the resin.

The fine powder resins are produced by polymerizing TFE in the presence of a dispersing agent and thus the process resembles emulsion polymerization. The polymer is highly crystalline. The average particle size in dispersion is about 0.2 $\mu$m. The fine powder resins cannot be ram extruded, but instead can only be paste extruded by first mixing them with a lubricant.

When the modified granular PTFE resin used herein is dispersed in an aqueous dispersion, it can be sprayed or cast onto a surface to form a coating. After removal of the water and other volatiles by drying, and after heating to sinter or fuse the particles, the fused (or sintered) product of the invention is obtained.

The coating formed is ordinarily about 50–2000 micrometers thick, but usually is 150–1500 micrometers.

One or more grades of modified granular PTFE may be employed. The modified granular PTFE can be a mixture of polymers in which one polymer has a modifiying comonomer which is, for example, hexafluoropropylene, and another polymer in which the modifying monomer is, for example, perfluoropropyl vinyl ether. The modified granular resin can also be mixed with minor amounts of unmodified granular if desired, The modified granular can also be either unsintered or presintered or a mixture of both. Use of unsintered resin tends to produce stronger fused products since the unsintered particles are soft and tend to pack to form a strong porous web having small pore sizes when sintered.

On the other hand, if the starting modified granular is presintered, the particles are harder and less compactible. When fused, the interparticle connection is less strong and larger pores are formed.

When mixtures of sintered and unsintered modified granulars are used, it is believed that the softer, unsintered particles form fibrillar rod-like moieties which link the harder sintered particles to provide increased interparticle connection strengths.

Granular PTFE copolymer is commercially unavailable in the sintered form. Where sintred copolymer is required this may be produced by subjecting the unsintered copolymer particles to a preliminary sintering step, and if necessary breaking down the sintered copolymer into particles of the required size again.

The resin particles of modified granular PTFE in aqueous dispersion should have an average particle size in the range of 1–600 micrometers, and preferably 10–300 micrometers.

Particles of an organic or inorganic filler materials may also be included in the aqueous dispersion. Examples of fillers include carbon, activated carbon, glass, chromium oxide, titanium oxide, chopped expanded PTFE, silica dioxide, PEEK, polyimide and the like. A large variety of fillers can be employed to add specific properties to the final fused composition. The amount of filler can be as high as 60% or more based on weight of composition, but ordinarily is less than 50%, and preferably less than 40%.

The modified granular resin or mixtures of resins, is dispersed in water in the presence of any suitable surfactant and thickening agent. Amount of resin present can vary over a wide range. Preferably 30–70 weight percent resin solids will be present. The aqueous dispersion is then coated on a substrate, such as by spraying, dipping, or casting. The substrate can be a release type substrate from which the subsequently baked or sintered product is peeled away to obtain a self-supporting film or membrane. The substrate can be a supporting mesh that forms an integral part with the sintered product.

The liquid-wet coating is then dried and baked at elevated temperatures. A preliminary step may involve heating somewhat slowly to 100° C. in order to drive off water and any other volatiles, and holding at that temperature for a short period of time. thereafter, the temperature is ordinarily raised progressively up to 330 to 385° C. (e.g. 340 to 370° C.) in order to allow sintering and fusion of the modified granular particles.

The films and webs so obtained can be used for a variety of purposes. They can be used as webs or rollers for oil supply or as wipers in photocopy equipment, due to the good supply and rate control provided by the small size of the pores of the material. They can be used to filter out particulate; or, when containing absorptive fillers, to filter out gases in gaseous mixtures. Because the material is made of PTFE, it has the good chemical inertness, abrasive resistance and heat degradation resistance associated with ordinary PTFE structures.

Test Procedures

Gurley Number

The degree of air flow through the test sample is determined by the Gurley test. In this test, the number of seconds required for 100 cc of air to pass through one square inch of material under a pressure drop of 4.88 inches of water is measured.

Density

Unless otherwise stated, the density of the PTFE is determined by weighing a sample thereof in two different media, viz, air and water at room temperature. Water is non-wetting medium for PTFE and consequently, the resulting density measurements refer to the porous PTFE. The weights were determined using an Avery VA124 analytical balance. The porous PTFE density is calculated as shown below.

$$\frac{\text{(Weight in Air) (Density of Water at Room Temperature)}}{\text{(Weight in Air - Weight in Water)}}$$

Porosity

% porosity is determined from density measurements in wetting and non-wetting mediums i.e., isopropyl alcohol (IPA) and water respectively, as shown below:

$$\% \text{ porosity} = \frac{\text{(Density in IPA - Density in Water)}}{\text{(Density in IPA)}^{\times 100}}$$

Particle Size

Particle size of the PTFE resins used was determined as follows: using a magnetic stirrer and ultrasonic agitation, 2.5 grams of PTFE powder were dispersed in 60 ml isopropyl alcohol. (Ultrasonic Probe Model W-385, manufactured by Heat Systems-Ultrasonics, Inc.).

Aliquots of 4–6 ml of the dispersed particles were added to approximately 250 ml of circulating isopropyl alcohol in a Leeds & Northrup Microtrac FRA Particle Size Analyzer. Each analysis consisted of three 30-second runs at a sample circulation rate of 2 liters/minute during which light scattering by the dispersed particles is automatically measured and the particle size distribution automatically calculated from the measurements.

Pore Size Measurements (Coulter Porometer)

The pore size of the materials is determined by a Coulter Porometer II which uses a liquid displacement technique. The sample is thoroughly wetted with a liquid of low surface tension and low vapor pressure e.g., Coulter Porofil, such that all the pores have been filled with the liquid. The wetted sample is subjected to increasing pressure, applied by a gas source. As the pressure is increased, the surface tension of the liquid is finally overcome and the liquid is forced out of the pores. By monitoring the gas pressure applied to the sample and the flow of gas through the sample when liquid is expelled, a "wet" run is obtained. The sample is then tested "dry" without liquid in the pores and a "dry" run is obtained. By comparing both "wet" and "dry" runs, the maximum (also called the bubble point), minimum and mean pore size can be calculated by the porometer using the Washburn equation shown below:

$$Pr = 2 \gamma \cos \theta$$

P=Gas pressure
r=Capillary (or pore) radius
γ=Surface tension of wetting liquid
θ=Contact angle between wetting liquid and pore surface Tensile Strength Tensile measurements were carried out according to ASTM D461-87 Part 12 using an Instron 1011 Tensile Test Machine fitted with a 5KN load cell.

EXAMPLE 1

The following proportions (% volume) of liquid formulations were blended together for 2 minutes using a Silverson mixing head:

20.9% carboxymethyl cellulose solution
74.5% water
3.6% zonyl FSN-100 surfactant solution
1.0 % triethanolamine This mixture will be referred to as the "surfactant concentrate." The carboxymethyl cellulose solution was prepared by dissolving carboxymethyl cellulose (which acts as a thickening agent) in water at a 1% (by weight) concentration. The FSN-100 surfactant is a non-ionic perfluoroalkyl ethoxylate mixture. The FSN-100 surfactant solution consisted of a mixture of four parts FSN-100, three parts water and three parts isopropyl alcohol (by weight).

4 kgs of DuPont/Mitsui unsintered modified granular PTFE labelled 70J, with an average particle size of 25 microns were given an initial thermal treatment by spreading the particles evenly over an aluminum tray and heating in an oven at 330° C. for 6 hours. The modifying units of the 70J were units of perfluoropropyl vinyl ether present in an amount less than 1 weight percent. After cooling, the resin had fused together indicating that some degree of sintering of the resin had taken place. The fused powder was broken down into various particle size distributions using an industrial blender and screener.

600 g of the 330° C. treated 70J resin with an average particle size of 173 microns and 900 g of "surfactant concentrate" were blended together for 60 seconds in a Waring blender to form a suspension. The resulting aqueous suspension was suitable for spray application. The suspension was sprayed onto a 304L stainless steel mesh (Plain Hollander weave 50 mesh per inch warp, 250 mesh per inch weft, warp wire diameter 0.140 mm, weft wire diameter 0.112 mm, nominal micron rating 60) using a Binks BBR gun. The spray coated mesh was dried in an oven at 65° C. for 1 hour. The temperature was then increased over several hours, up to 365° C. and held at this temperature for 2.5 hours to complete the baking process. After cooling, the resulting film could be peeled away from the stainless steel mesh.

The physical properties of this material were compared with those obtained using a sintered unmodified PTFE resin—9B and an unsintered unmodified PTFE resin—7A which has been subjected to a similar in-situ sintering stage. The results are shown in the following Table.

TABLE

| Sample | Thermal | Thickness (mm) | Tensile Strength (N/cm$^2$) | Gurley | Density (g/cm$^3$) | Porosity (%) | Min. Pore (μm) | Max. Pore (μm) | Mean Pore (μm) |
|---|---|---|---|---|---|---|---|---|---|
| 70J | 6 hrs. @ 330° C. | 0.96 | 91.4 | 0.3 | 0.830 | 61.6 | 7.203 | 35.89 | 12.40 |
| 7A | 6 hr. @ 330° C. | 0.83 | 86.6 | 0.53 | 0.743 | 65.7 | 4.515 | 18.39 | 7.211 |
| 9B | Sintered Resin- | 0.83 | 79.0 | 1.10 | 0.831 | 62.8 | 3.530 | 13.68 | 6.040 |

It is seen that the fused product based on modified granular PTFE had a higher tensile strength and therefore was stronger. Importantly, it is seen that the modified granular had a larger mean pore diameter, but even so had greater strength. If the unmodified resins had had such a large pore size, they would have not been handleable without fracturing.

EXAMPLE 2

The following proportions (% volume) of liquid formulations were blended together for 2 minutes using a Silverson mixing head:

20.9% carboxymethyl cellulose solution 74.5% water 3.6% zonyl FSN-100 surfactant soluton 1.0% triethanolamine This mixture will be referred to as the "surfactant concentrate." The carboxymethyl cellulose solution was prepared by dissolving carboxymethyl cellulose (which acts as a thickening agent) in water at a 1% (by weight) concentration. the FSN-l00 surfactant is a non-ionic perfluoroalkyl ethoxylate mixture. The FSN-100 surfactant solution consisted of a mixture of four parts FSN-100, three parts water and three parts isopropyl alcohol (by weight).

400 g of Daikin unsintered, modified granular PTFE labelled Mill with an average particle size of 40 microns, 725 g of "surfactant concentrate" and 5 g of food coloring dye were blended together for 60 seconds using a Waring blender to form a suspension. The dye was present as a visual aid in determining the surface finish of the ensuing spray coat. The modifying units are believed to be derived from HFP or PPVE. The resulting aqueous suspension was suitable for spray application. The suspension was sprayed onto a 304L stainless steel mesh (Plain Hollander weave, 50 mesh per inch warp, 250 mesh per inch weft, warp wire diameter 0.140 mm, weft wire diameter 0.112 mm, nominal micron rating 60) using a Binks BBR gun. The spray coated mesh was dried in an oven at 65° C. for 1 hour. The temperature was then increased over several hours, up to 365° C. and held at this temperature for 2.5 hours to complete the baking process. After cooling, the resulting fused sheet could be peeled away from the stainless steel mesh.

The physical properties of the sheet were compared with those obtained using an unsintered, unmodified PTFE resin—7A which has been subjected to a similar processing stage. These results are shown below.

| Resin | Thickness (mm) | Tensile Strength (N/cm$^2$) | Density (g/cm$^3$) | Porosity (%) | Mean Pore (μm) |
|---|---|---|---|---|---|
| 7A unmodified | 0.57 | 471.4 | 1.245 | 44.6 | 2.01 |
| M111 modified | 0.48 | 603.9 | 1.257 | 38.2 | 2.84 |

It is clear that material processed from the modified granular resin, Mill, has significantly greater tensile strength than the unmodified PTFE equivalent, 7A.

I claim:

1. A porous material formed of particles of a non-melt-processible granular PTFE copolymer wherein the comonomer units compose less than 2% by weight of the polymer and wherein the particles are fused together to form a network of fused particles in which the network defines a tortuous path of interconnected voids between the fused interconnected particles.

2. The material of claim 1 in the form of a sheet.

3. The material of claim 1 wherein the comonomer units are derived from a fluorinated organic monomer.

4. The material of claim 1 wherein the comonomer units are derived from hexafluoropropylene or perfluoropropyl vinyl ether.

5. Process for forming a porous PTFE material which comprises:

(a) forming an aqueous dispersion of particles of a non-melt-processible granular PTFE copolymer wherein the comonomer units compose less than 2% by weight of the copolymer;

(b) forming said dispersion into a coating on a substrate;

(c) drying the coating; and (d) heating the coating to fuse together the particles to form a network of fused particles in which the network defines a tortuous path of interconnected voids between the fused interconnected particles.

6. A process according to claim 5 wherein the granular PTFE copolymer particles are sintered granular PTFE copolymer particles.

7. A process according to claim 5 wherein the granular PTFE copolymer particles include a mixture of sintered and unsintered granular PTFE copolymer particles.

8. A process according to claim 6 which comprises the further step -of sintering unsintered granular PTFE copolymer particles, so as to produce said sintered granular PTFE coplymer particles.

9. The porous material of claim 1 wherein the porosity is at least 38%.

* * * * *